United States Patent
Jessberger et al.

(10) Patent No.: US 6,598,854 B1
(45) Date of Patent: Jul. 29, 2003

(54) FLAP MECHANISM

(75) Inventors: Thomas Jessberger, Rutesheim (DE); Stefan Maier, Besigheim (DE); Robert Vaculik, Marbach (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/807,895

(22) PCT Filed: Oct. 14, 1999

(86) PCT No.: PCT/EP99/07724

§ 371 (c)(1),
(2), (4) Date: Apr. 19, 2001

(87) PCT Pub. No.: WO00/23701

PCT Pub. Date: Apr. 27, 2000

(30) Foreign Application Priority Data

Oct. 21, 1998 (DE) .......................................... 198 48 440

(51) Int. Cl.$^7$ .................................................. F16K 1/22
(52) U.S. Cl. ........................ 251/214; 251/305; 123/337
(58) Field of Search ................................. 251/305, 306, 251/307, 308, 214; 123/337; 277/359, 360, 471, 931

(56) References Cited

U.S. PATENT DOCUMENTS

| | | | |
|---|---|---|---|
| 3,643,583 A | | 2/1972 | Fritz |
| 3,693,935 A | * | 9/1972 | Thauer ..................... 251/305 |
| 3,724,812 A | * | 4/1973 | Richardson ................ 251/306 |
| 3,774,879 A | * | 11/1973 | Zink ...................... 251/308 X |
| 3,804,366 A | * | 4/1974 | Rubright ................... 251/305 |
| 4,214,731 A | * | 7/1980 | Oota et al. ................ 251/306 |
| 4,604,254 A | * | 8/1986 | Yamamoto et al. ...... 251/308 X |
| 4,877,339 A | * | 10/1989 | Schuster et al. ......... 251/303 X |
| 5,098,064 A | * | 3/1992 | Daly et al. ................. 251/306 |
| 5,632,304 A | * | 5/1997 | Kempka et al. ......... 251/308 X |

FOREIGN PATENT DOCUMENTS

| | | |
|---|---|---|
| DE | 43 29 526 A | 3/1995 |
| DE | 44 23 370 A | 1/1996 |
| DE | 195 16 927 A | 11/1996 |
| DE | 195 28 266 A | 1/1997 |
| DE | 196 15 438 A | 1/1997 |
| DE | 197 17 347 C | 8/1998 |
| DE | 197 07 828 A | 9/1998 |
| EP | 0 482 272 A | 4/1992 |
| EP | 0 747 587 A | 12/1996 |
| FR | 2 119 705 A | 8/1972 |

* cited by examiner

*Primary Examiner*—Ehud Gartenberg
*Assistant Examiner*—Eric Keasel
(74) *Attorney, Agent, or Firm*—Crowell & Moring LLP

(57) ABSTRACT

A flap mechanism includes elements for compensating tolerances and shrinkage of the flap. The compensating elements include a flap edge which is applied to the flap by assembly injection molding after the flap has cooled, thereby decreasing any gap produced between the flap and a surrounding frame by shrinkage of the flap. In addition the flap has a flap shaft which can be journaled in the frame through a conical region on the shaft such that axial shrinkage of the shaft to produce a mounting which is free of play. This construction makes it unnecessary to use additional sealing elements at the mounting locations of the flap, and the flap is also prevented from vibrating in its mounting which, in a worst case scenario, could lead to destruction of the flap.

7 Claims, 2 Drawing Sheets

FLAP MECHANISM

BACKGROUND OF THE INVENTION

The invention concerns a flap mechanism, in particular an assembly injection-molded switching flap.

Assembly injection-molded switching flaps are known by way of example from EP 482272. The flaps are manufactured together with their frame in two steps in a molding tool. In the first step, the frame is injected, with the cores that are pushed in from different directions occupying the volume provided for the switching flap. These are removed in part for the second step so that the switching flap can be injected into the now-free volume. In so doing, the walls of the mold for the switching flap result in part from the cores and in part from the walls of the flap frame. The plastic components for the flap, however, are selected such that they do not connect with the plastic of the flap frame.

After cooling, the flap drops out of the injection molding tool and can be put to its use without post-treatment. As a result of the shrinkage of the injection molded flap during cooling, however, play develops between flap and flap frame as well as between flap shaft and flap frame. Ultimately the ability of the flap to rotate is also ensured by this.

As a result of the manufacturing process of the assembly injection-molded flap, the magnitude of the bearing play between flap shaft and flap frame cannot be freely selected. In addition, the bearing play in operation of the switching flap also depends on the prevailing ambient temperature and humidity.

Especially at low temperatures, the switching flap shrinks in the flap frame, as a result of which bearing play increases. This effect is not desired. With excessively great bearing play, the flap can be destroyed through stimulation of vibrations (for example by an internal combustion engine). In addition, when there is a requirement for a seal against the surroundings, an additional seal element is necessary at the bearing locations between flap frame and flap shaft.

Excessive shrinkage of the flap vanes in the cross section of the flap frame is undesired. As a result, a gap arises as a result of which the flap can no longer completely close the cross section of the flap frame.

The problems of shrinkage of the flap axle under various operating conditions can also present a problem in the case of assembled switching flaps. This is generally the case if the switching flap shrinks to a greater extent at lower temperatures than the flap frame.

SUMMARY OF THE INVENTION

The object of the invention therefore is to provide a flap mechanism which has an optimal seal with respect to the surroundings or to the cross section which is to be closed independently of the operating condition and of the manufacturing process of the flap mechanism, wherein bearing play between the flap axle and the flap frame should be minimized or even prevented in all operating conditions.

This object is achieved by the invention as described as claimed hereinafter.

The flap mechanism according to the invention is configured such that the shrinkage of the flap which occurs as a result of the manufacturing process or because of temperature and/or atmospheric humidity fluctuations can be compensated.

This is ensured in particular through structural design measures at the edge of the flap vanes or at the flap shaft. In this manner, flap play in the bearing of the shaft in the frame can be prevented, and also the tightness requirements for the closed flap or at the shaft bearing can be fulfilled.

In order to avoid a gap s resulting from the shrinkage of the flap, a second component can be injected onto the assembly injection-molded flap after it cools which fills out the gap s. Naturally, this component will also shrink. However, the gap which results will be far smaller since the volume of the cooled flap vane will not change after injection of the second component. Original gap s, which results after the injection molding of the first component in the flap frame, can be reduced by the factor b/s, where b represents one-half the width of the flap from the axis of rotation to the edge of the flap vane.

A flap module manufactured entirely using the assembly injection molding technique thus can be produced in three steps. In the first step, the frame is injection molded; in the second, the flap body comprising flap vanes and flap shaft; and in the third step, the flap edge is injection molded. For the manufacture of the flap edges, appropriate supply channels must be provided in the injection molding tool, while for producing the switching flap itself, the bores in the flap frame for receiving the flap shaft can be used.

The assembly injection-molded flap mechanism is preferably manufactured from synthetic resin material. A prerequisite for the selection of material for the individual components is that the components for the flap edge adhere to the flap vanes but not to the flap frame. This is particularly the case if the flap edge is injected from the same synthetic resin material as the flap vane, because the flap vanes also must not adhere to the flap frame.

However, it is also advantageous to provide an elastic material such as TPE (thermoplastic elastomer) for the flap edge. The elastic edge of the flap vane ensures a better seal of the flap with respect to the edge of the flap, in particular if a corresponding shoulder is provided in the interior of the flap edge against which the switching flap rests.

According to another embodiment of the invention, the flap shaft can be configured at least partially conical in the area of the bearing in the flap frame. A corresponding cone, which corresponds to the flap shaft, must also be provided in the receiving passageway in the flap frame. The opening of the cone can point toward the outside of the flap frame or toward the interior of the flap frame. Which opening direction is more appropriate in a given instance depends on the selection of the material, as will be explained in greater detail below.

Normally, the flap will shrink to a greater degree than the flap frame when the temperature or atmospheric humidity decreases. This is the application case in which the cone in the flap shaft and the flap frame more logically is provided with an opening direction toward the outside. The shrinking of the flap shaft has an axial and a radial component. The radial shrinkage component enlarges or creates a gap between the conical receiver in the flap frame and the flap shaft. At the same time, however, the axial shrinkage of the flap shaft results in a shortening of the axle and, as a result, a compensation for the gap which has arisen. For this it is necessary that the flap shaft be fixed axially. This can advantageously be accomplished through providing a second conical zone at the other end of the flap shaft. Axial fixing can, however, also be ensured through a shoulder on the shaft. An axial fixing of the flap shaft is naturally also established through the flap vanes. They limit the axial play of the flap shaft in the opening of the flap frame.

The divergence angle of the cone can be selected depending on the material used and the dimensions of the switching flap such that the axial and radial shrinkage components of the flap shaft offset each other. Alternatively, the divergence angle can also be selected such that with decreasing temperature, a slight axial tensioning of the flap shaft occurs. In this manner, tolerances in the flap shaft and the flap frame can be compensated, and it can be ensured that the flap shaft is journaled in the flap frame without play through the tolerance range. The undersize of the flap shaft in the low temperature range then at the same time provides for compensation for wear.

It is advantageous not to provide the conical area of the flap shaft over its entire bearing zone in the flap frame so that in addition to the conical zone there is also a cylindrical zone of the flap shaft. Through this measure, the advantages of the flap according to the invention can be combined with the advantages of the known solution. Specifically, at high temperatures there is play in the conical zone since the flap shaft expands more strongly axially than radially. At the same time, however, the diameter of the flap shaft in the cylindrical zone increases to a greater extent than the hole in the flap frame for receiving the flap shaft expands. The function of bearing the shaft without play thus is assumed at high temperatures by the cylindrical zone of the flap shaft. Through appropriate configuration of the cone, it is possible to arrange that the bearing of the shaft at a certain temperature passes from the cylindrical to the conical zone so that bearing with no play is present under all operating conditions of the flap. Essentially the same statements apply for the influence parameter of atmospheric humidity as for temperature.

According to a special embodiment, the cylindrical zone can also transition continuously into the conical zone. This results in a funnel-shaped configuration of the passageway openings in the frame so that there is no edge between the cylindrical and the conical zones. The funnel can be configured in such a way that the flap shaft as a result of its expansion always comes into contact in only a small region of the bore in the flap frame. With increasing temperature, this contact surface then migrates from the conical zone into the cylindrical zone. An advantage of this configuration is minimal friction throughout the entire operating range of the flap.

A special configuration of the invention provides that in at least one bearing location of the flap shaft in the flap frame, two conical zones with oppositely directed slope angles be formed thereon. In this arrangement, a cylindrical zone of the flap shaft can lie between the two conical zones. The manner of operation of this bearing variant corresponds to those described above. This variant is conceivable, for example, in a floating bearing of the switching flap in the flap frame.

These and further features of the preferred embodiments of the invention can be found in the claims as well as the description and the drawings, with it being possible to realize the individual features either severally or jointly in the form of subcombinations in embodiments of the invention and in other fields and may represent advantageous and protectable embodiments for which protection is hereby claimed.

BRIEF DESCRIPTION OF THE DRAWINGS

Additional details of the invention are described in the drawings with reference to schematic exemplary embodiments.

DETAILED DESCRIPTION OF PREFERRED EMBODIMENTS

Figure 1:
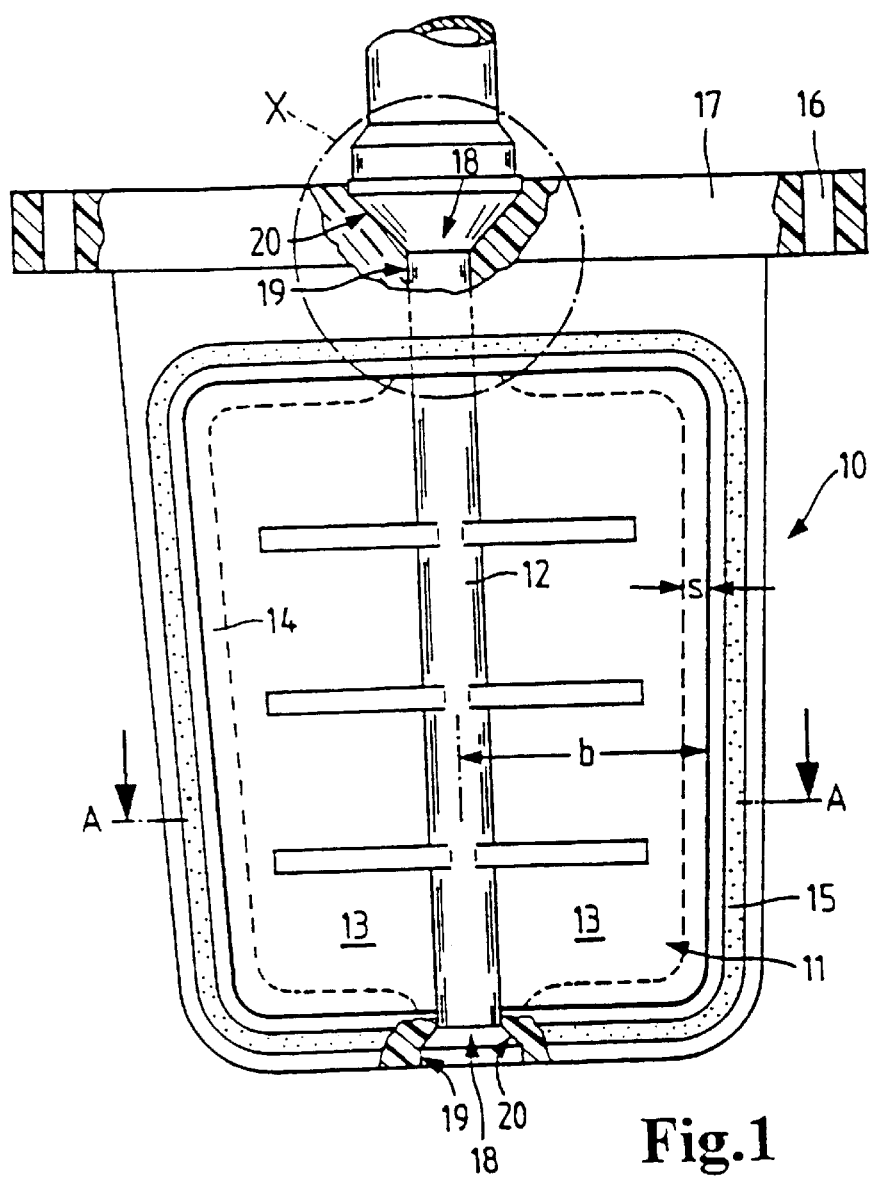
FIG. 1 shows a plan view of an assembly injection-molded flap module wherein the flap has a flap edge as a second component as well as conical zones of the flap shaft in both bearing locations in the flap frame.

In FIG. 1, the flap mechanism according to the invention is presented as a top view. It comprises a flap frame 10 in which a flap 11 is formed through assembly injection molding. Thus the flap, comprising a flap shaft 12, flap vanes 13, and a flap edge 14, is constructed as one piece. Flap edge 14, the separation of which from the flap vanes 13 is depicted as a broken line, is injection molded onto flap 13 in a separate processing step following cooling of the flap.

Frame 10 has seal grooves 15 which upon installation of the flap in a pipe section (not shown) ensure a seal between the interior space and the surroundings with seals (also not shown). Furthermore, the frame has an attachment flange 17. It can be used to fasten the flap between the pipe sections. Holes 16 in fastening flange 17 can serve to receive screws.

The flap shaft 12 is journaled in passageways 18 in the flap frame. The contour of the passageways are indicated by a broken line in the flap frame and correspond to the contour of flap shaft 12 in the bearing zones, if one ignores bearing play. The passageways have a cylindrical zone 19 and a conical zone 20.

Figure 2:
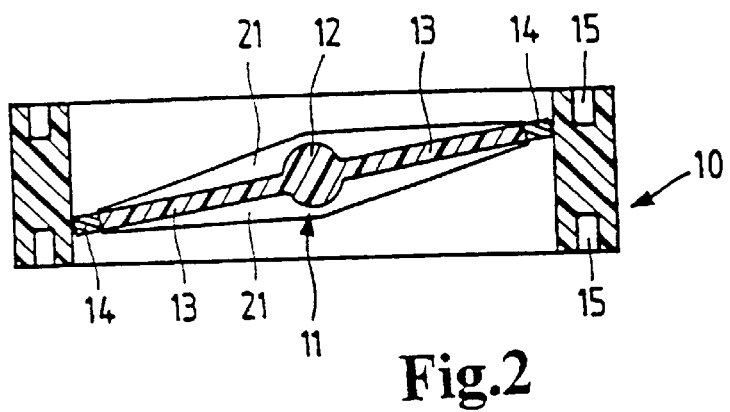
FIG. 2 shows section A—A through the assembly injection-molded flap module according to FIG. 1.

In FIG. 2, flap 11 and frame 10 are depicted in section. It can be seen that frame 10 has a seal groove 15 on both sides. Switching flap 11 is assembly injection-molded in a slightly diagonal position in the frame. As a result, the edge of the flap 14 makes contact in frame 10. As a result, the sealing tightness of the flap is increased and the flap is prevented from jamming in the closed state. Flap shaft 12 and flap vane 13 are additionally stabilized by ribs 21.

Figure 3:
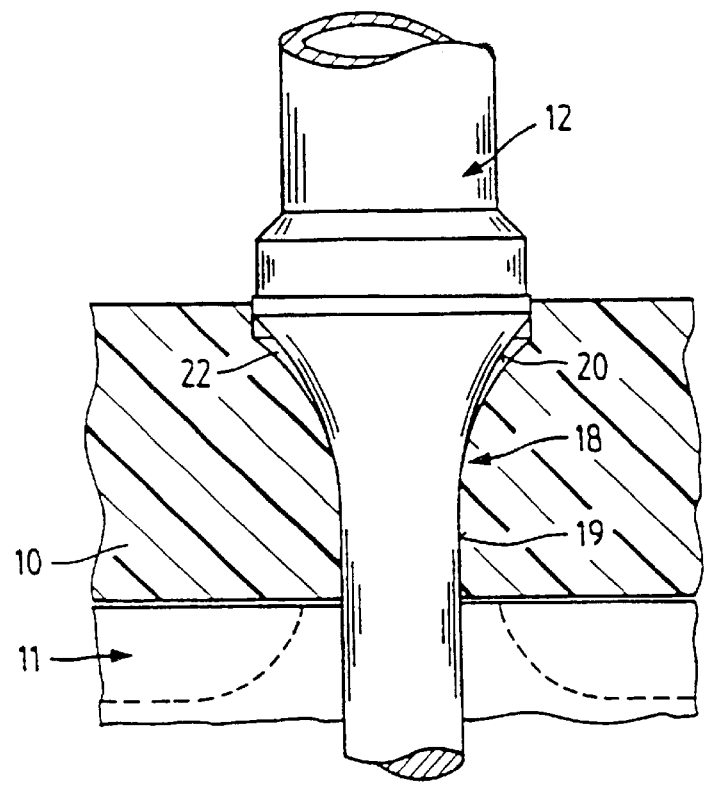
FIG. 3 shows the configuration of the flap bearing in the flap frame with continuous transition from the cylindrical into the conical zone in accordance with detail X in FIG. 1.

In FIG. 3, a version of passageway 18 is depicted in which the transition from the cylindrical zone 19 to the conical zone 20 takes place continuously. FIG. 3 shows flap shaft 12 in passageway 18 at high temperatures of the operating range, with the play 22 which results in the conical zone 20 between flap shaft 12 and passageway 18 being shown exaggerated.

Figure 4:
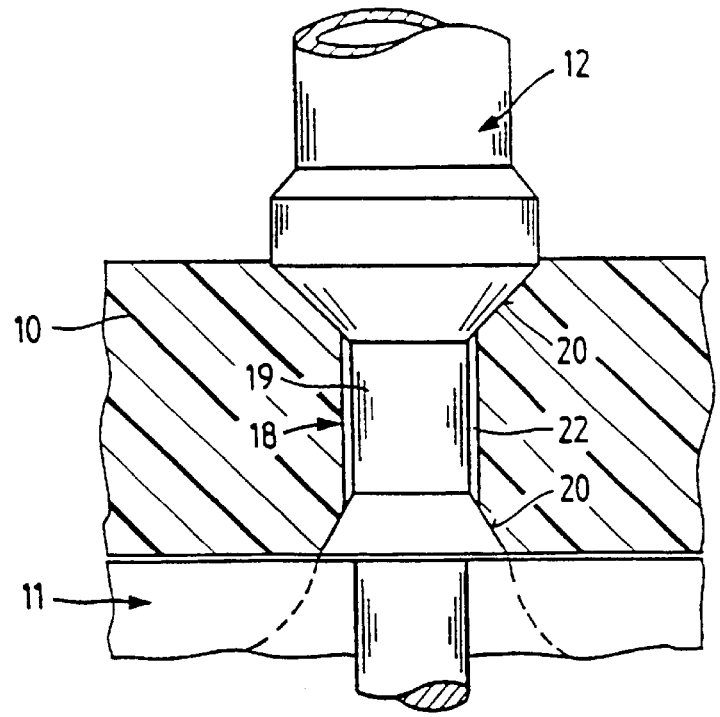
FIG. 4 shows a shaft bearing of the flap in the flap frame with two conical zones in accordance with detail x in FIG. 1.

FIG. 4 shows the construction of flap shaft 12 with two conical zones 20 in a passageway 18 in frame 10. Between the conical zones, a cylindrical zone 19 is arranged. The flap is depicted for lower temperatures of the operating range with exaggerated play 22 in cylindrical zone 19.

What is claimed is:

1. A flap mechanism comprising a frame and a flap member comprising a flap shaft and at least one flap vane, said flap shaft being journaled in passageways in said frame such that the flap member can pivot between a closed position in which an opening through said frame is at least substantially closed and a position in which said opening is open; wherein said flap shaft and at least one of the passageways of said frame in which the flap shaft is journaled have two conical zones with opposed slop angles for compensating for shrinkage of the flap member due to the process by which it is manufactured or to temperature or atmospheric humidity fluctuations, and the materials of the frame and flap member and the dimensions of the flap shaft and the at least one passageway are such that there exists a temperature range in which there is no play between the flap shaft and said at least one passageway in said conical zones.

2. A flap mechanism according to claim 1, wherein said flap member is assembly injection-molded inside said frame.

3. A flap mechanism according to claim 1, wherein the flap shaft and the at least one passageway further comprise at least one cylindrical zone, and there exists a temperature range in which there is no play between the flap shaft and said at least one passageway in said cylindrical zone.

4. A flap mechanism according to claim 3, wherein said conical zones and said cylindrical zone adjoin one another, and said conical zones transition without an edge into the adjoining cylindrical zone.

5. A flap mechanism according to claim 1, wherein the flap member comprises first and second components successively assembly injection-molded in the frame, the first component forming a flap body comprising the flap shaft and the at least one flap vane, and the second component forming a flap edge, wherein said flap body shrinks as a result of the process by which the flap member is manufactured, and wherein said flap edge is applied to said flap body after shrinkage of said flap body.

6. A flap mechanism according to claim 5, wherein the flap body is composed of synthetic resin material, and the flap edge is composed of an elastic material.

7. A flap mechanism according to claim 6, wherein the flap edge is composed of a thermoplastic elastomer.

* * * * *